June 19, 1928.  
C. G. FAWKES  
1,673,974  
METHOD OF AND MEANS FOR FORMING AIR POCKETS IN SOLID RUBBER  
Filed Jan. 14, 1927
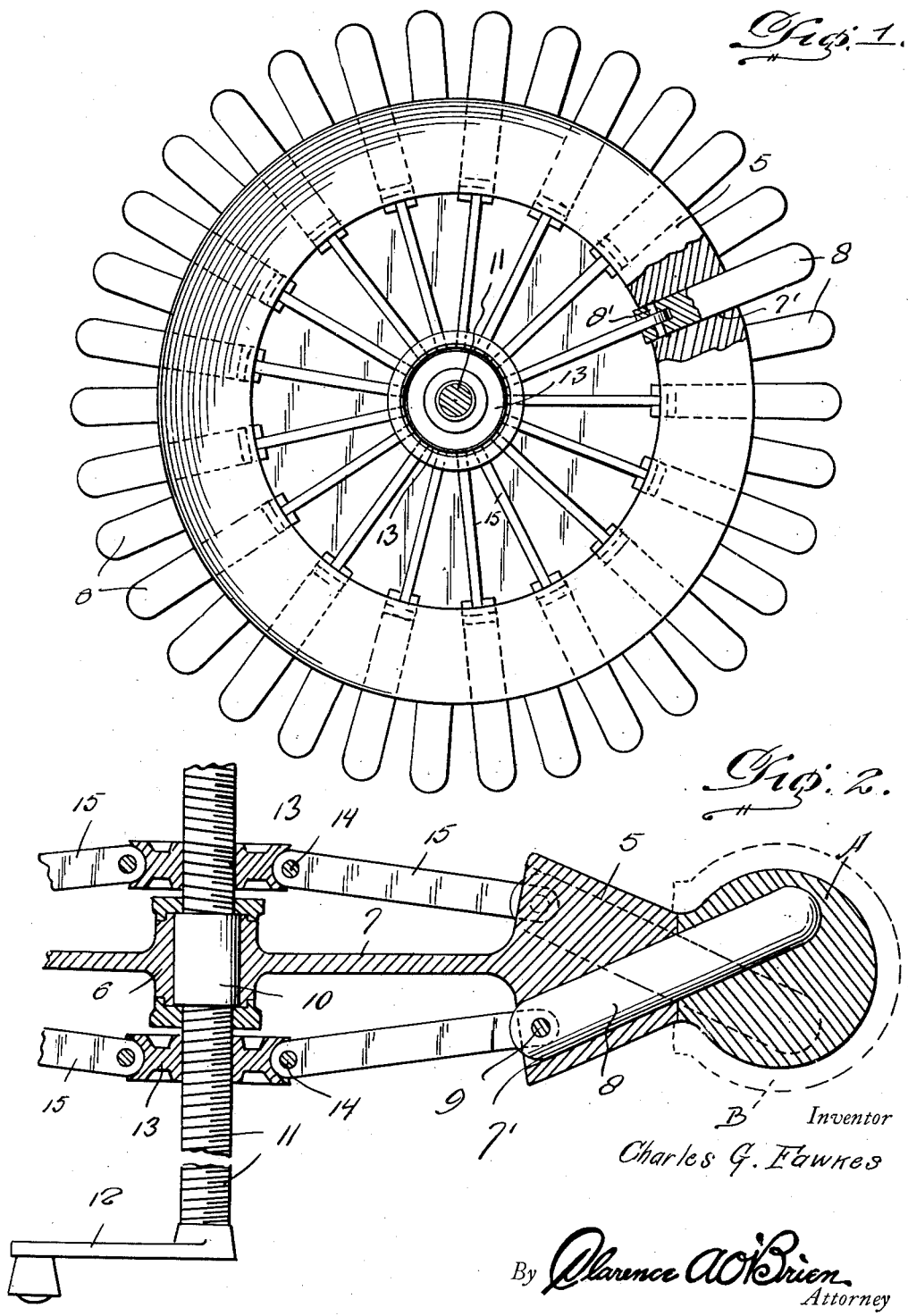

Patented June 19, 1928.

1,673,974

UNITED STATES PATENT OFFICE.

CHARLES G. FAWKES, OF DENVER, COLORADO.

METHOD OF AND MEANS FOR FORMING AIR POCKETS IN SOLID RUBBER.

Application filed January 14, 1927. Serial No. 161,152.

This invention relates to a method of and means for forming air pockets within a solid rubber tire during the manufacture of the tire and has for its primary object to provide such a method and such a means whereby air pockets may be formed in solid rubber tires without materially adding to the cost of manufacture, and without requiring any unusual skill upon the part of the operator.

Furthermore, the provision of a solid rubber tire formed with air pockets by reason of the improved method and mechanism will be so resilient as to substantially supplant the use of pneumatic tires which are very liable to blow outs or become punctured.

A further and important object of the invention is to provide a mechanism whereby said air pockets are provided by forcing pin-like members of large cross-sectional area into the body of the tire for so compressing the rubber material as to provide such air pockets after the pin members having been removed.

By reason of the formation of air pockets in such a manner, the material comprising the tire is greatly compressed in all directions for closing all pores or interstices that may exist therein that proves greatly detrimental in the use of solid tires now on the market, by reason of the fact that dirt, water, and other foreign matter will enter therein resulting in the rapid deterioration of the tire.

With the foregoing and other objects in view as the nature of the invention will be better understood, the same comprises the novel form, combination and arrangement of parts hereinafter more fully described, shown in the accompanying drawing and claimed.

In the drawing wherein like reference characters indicate corresponding parts throughout the several views:

Figure 1 is a view mainly in side elevation and partly in cross section of a device constructed to facilitate the carrying of the method, and Figure 2 is a fragmentary cross section thereof and with which is associated a mass of rubber before the vulcanizing or curing operation.

Reference will be first made to the mechanism whereby the improved method may be carried out. This mechanism consisting of a wheel-like unit including a circular solid rim 5, and a central hub 6 integrally joined to the rim 5 by a solid web 7. The side walls of the rim portion of the wheel-like unit are of tapering formation as indicated in Figure 2 and extending diagonally through the rim portion at opposite sides of the web 7 are circular openings 7' in spaced relation through the entire circumference of the rim and being in parallel relation with the adjacent tapered sides of said rim 5. These openings 7' extend entirely through the rim 5 and terminate at their outer ends at the direct center of the outer surface of the rim, and in true spaced circumferential relation.

Loosely slidably disposed in the openings 7' at opposite sides of said web are relatively elongated pins 8 of circular formation and being rounded at their outer ends as disclosed.

Loosely mounted within the hub 6 of the wheel like unit is the central unthreaded portion 10 of a threaded bar 11, the threads of opposite sides on the central portion being of opposite pitch, while one end of the threaded bar is provided with a crank handle 12. Threaded upon the bar 11 at opposite sides of the wheel unit are plate like members 13—13, to the periphery of which are pivoted as at 14 the inner ends of link bars 15, the outer ends of which are pivotally secured to the inner sloted ends 8' of said pins 8.

In the use of a device of this character in carrying out the method of producing a solid rubber tire having air pockets therein, a molded tire shaped mass of rubber A within a vulcanizing or curving mold B is disposed over the rim 5 after the pins 8—8 have been drawn inwardly in the openings 7' of the rim. The crank handle 12 is thence rotated for moving the plate members 13—13 in an inward direction for obviously forcing the pins 8 outwardly as indicated in the drawing. This outward movement of the pins will cause the outer ends of the same to pass into the mass of rubber A, and by reason thereof, such mass of rubber will be so compressed as to substantially close all pores and interstices therein. The vulcanizing or curing operation is thence performed after which the pins are removed and insomuch as the rubber has been molded or vulcanized around said pins air pockets will be present after the removal of said pins.

It will thus be seen that I have provided a highly novel method of and mechanism for forming solid rubber tires with air pockets to greatly increase the resiliency thereof, and even though I have herein shown and described the means as consisting of certain detail structural elements it is nevertheless to be understood that some changes may be made therein without effecting the spirit and scope of the appended claims.

Having thus described the invention, what I claim as new and desire to secure by Letters Patent is:—

1. In a tire working device of the character described, a wheel shaped unit, the rim portion of which is constructed for having a solid tire detachably disposed thereon, and means workable through the rim for so compressing the material comprising the tire as to form air chambers therein.

2. In a tire working device of the character described, a wheel shaped unit, the rim portion of which is constructed for having a solid tire detachably disposed thereon, and means workable through the rim for so compressing the material comprising the tire so as to form air chambers therein, said means consisting of elongated pins slidable through openings in the rim portion and power means associated with the wheel unit for moving said pins inwardly and outwardly through the openings in the rim portion.

3. In a tire working device of the character described, a wheel shaped unit, the rim portion of which is constructed for having a solid rubber tire detachably disposed thereon, pins slidably arranged within diagonal openings formed in the rim portion of the wheel shaped unit, said openings terminating at the inner and outer peripheral faces of the rim portion thereof, and means operable for projecting the pins through the outer ends of the opening for engagement within the tire material for so compressing the same as to form air pockets therein.

4. In a process of forming air pockets in solid rubber tires consisting in the application of a tire shaped mass of uncured rubber to a support projecting pins into the mass from the inner side thereof, then curing the rubber, withdrawing said pins, and removing the resultant product from the support.

5. In a method of forming air pockets in solid rubber tires consisting in the application of a generally tire shaped mass of uncured rubber upon a similarly shaped support, injecting pins into the mass from the inner side thereof and throughout the entire circumference of the tire and in a diagonal manner, then curing the rubber, later removing the pins from the cured rubber, and finally removing the resultant product from said support.

6. In a process of forming radially disposed air pockets within a solid rubber tire consisting in the injection of a pin radially into the uncured rubber, vulcanizing the same and then removing the pin therefrom.

7. In a tire working device of the class described, a wheel shaped unit including a rim, a hub, and an interconnecting portion, the rim portion being constructed for supporting a solid rubber tire thereon, while the latter is in an uncured state, pins radially slidable through the rim, a member projecting through the hub and rotatable therein, and means operatively connecting the pins with said member whereby the pins may be moved to an operative or inoperative position when the member is actuated.

8. In a tire working device of the class described, a wheel shaped unit including a rim, a hub, and an interconnecting portion, the rim portion being constructed for supporting a solid rubber tire thereon, while the latter is in an uncured state, pins radially slidable through the rim, a member projecting through the hub and rotatable therein, and means operatively connecting the pins with said member whereby the pins may be moved to an operative or inoperative position when the member is actuated, said means including a pair of oppositely moving elements arranged on the rotatable member on opposite sides of the hub, and links connecting the aforesaid elements to the inner ends of the respective radially slidable pins.

9. In a tire working device of the class described, a wheel shaped unit including a rim, a hub, and an interconnecting portion, said rim being provided with an annular series of radially disposed and diagonally arranged through openings, the outer ends of the openings terminating at the center of the outer peripheral face of the rim, elongated pins slidably arranged in the openings, a member projecting through the hub and rotatable therein, a pair of oppositely movable elements arranged on the rotatable member on opposite sides of the hub, and links interconnecting the aforementioned oppositely movable elements with the inner ends of the respective pins whereby said pins may be moved to an operative or inoperative position when the rotatable member is actuated to move the opposed elements in opposite directions.

In testimony whereof I affix my signature.

CHARLES G. FAWKES.